Oct. 6, 1953
E. R. McCOPPIN
2,654,843
WAVE GENERATOR
Original Filed Nov. 7, 1945
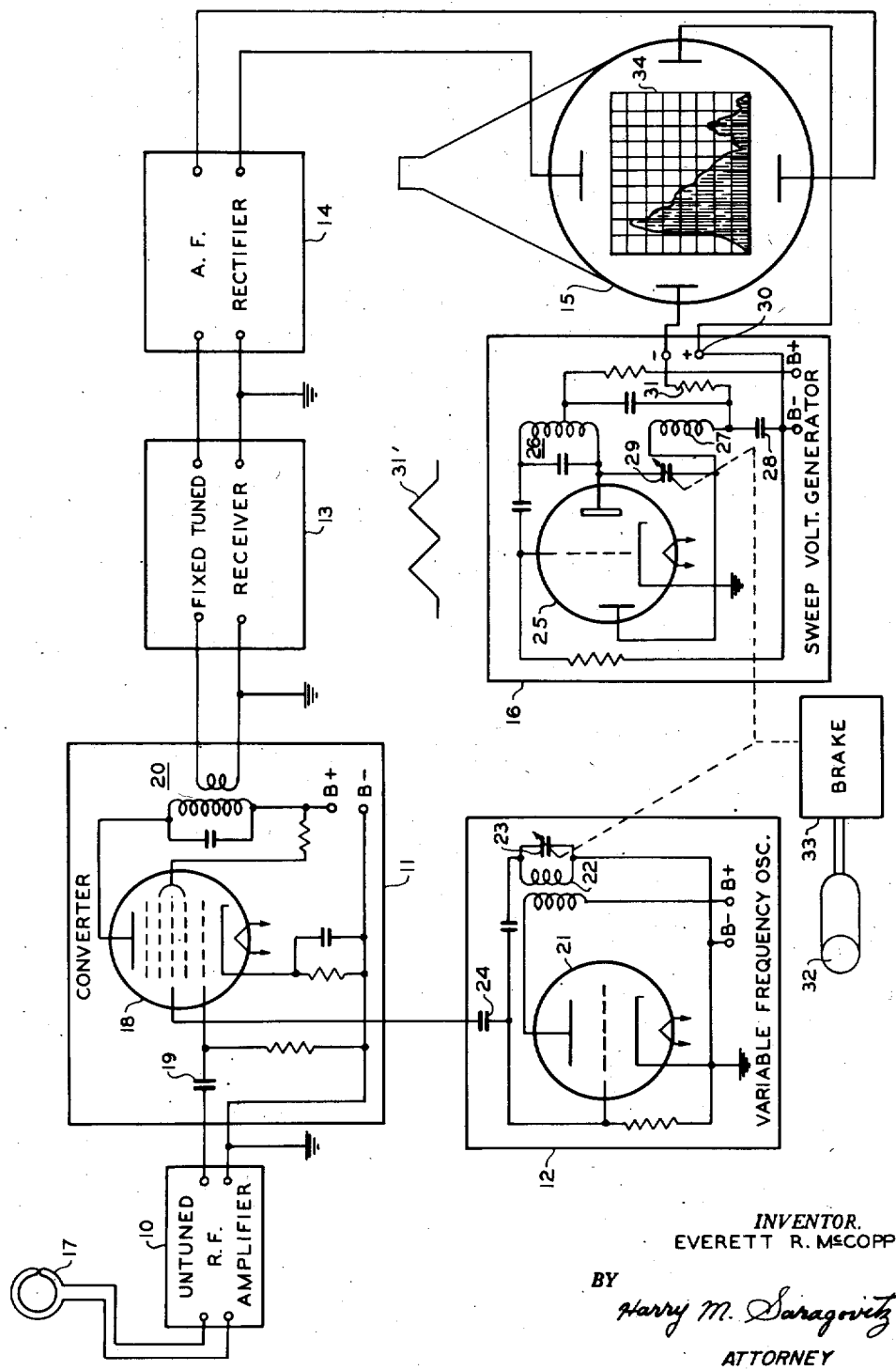
INVENTOR.
EVERETT R. McCOPPIN
BY
Harry M. Saragovitz
ATTORNEY Patented Oct. 6, 1953

2,654,843

UNITED STATES PATENT OFFICE 2,654,843

WAVE GENERATOR

Everett R. McCoppin, Dayton, Ohio

Original application November 7, 1945, Serial No. 627,273. Divided and this application July 27, 1949, Serial No. 107,132

8 Claims. (Cl. 250—36)

(Granted under Title 35, U. S. Code (1952), sec. 266)

The invention described herein may be manufactured and used by or for the Government for governmental purposes, without the payment to me of any royalty thereon.

This application is a division of application Serial Number 627,273, filed November 7, 1945, issued October 25, 1949, as Patent No. 2,485,620.

The present invention relates generally to wave form generators, and is more particularly directed to a sweep-voltage generator adapted to the production of a sweep-voltage whose value varies directly with the capacitance of a variable capacitor, for use with a panoramic radio-frequency receiver or spectroscope.

Noise disturbances induced in an antenna and received signals as well, are normally distributed over a considerable frequency band. Accordingly, apparatus intended for measurement and examination of such received signals or impulses must be designed to record or present their frequency as well as their amplitude within a selected portion of the radio spectrum. It is frequently desirable in such apparatus to halt the scanning and sweep at a given frequency in order to obtain an improved presentation at that point, but with apparatus heretofore known in the art, neither such an action nor any but a substantially linear sweep is possible.

Accordingly, it is the main object of this invention to provide a novel sweep-voltage generator which can be stopped at any point in its sweep and will thereupon continuously maintain the voltage at that point.

Another object of this invention is to provide a sweep-voltage generator which produces a sweep-voltage and is capable of maintaining a steady voltage of any desired value within said sweep-voltage range.

It is still another object of this invention to provide a new and improved sweep circuit for use in apparatus designed for noise or signal measurement, which will permit the examination of inputs at any given frequency within a given band, and will in scanning and display follow any desired law of frequency variation.

A further object of this invention is to provide a new and improved instrument for noise or signal measurement arranged to display simultaneously the amplitude and frequency of all signals and noise energy within a predetermined band.

For a complete understanding of the invention, as well as other objects and features thereof, reference is made to the following detailed description to be read in connection with the accompanying drawing, depicting in a functional block diagram partially in schematic form, one preferred embodiment of a spectroscope in accordance with the invention. The scope of the invention will be pointed out and defined in the accompanying claims.

The spectroscope as shown in the drawing mainly comprises an untuned radio-frequency amplifier 10, a converter stage 11, a variable high-frequency oscillator 12, a radio receiver 13, an audio-frequency rectifier 14, a cathode-ray oscilloscope 15, and a sweep-voltage generator 16.

In general terms the behavior of the spectroscope is as follows: Noise impulses are intercepted by a pick-up loop 17 or any other suitable radio-frequency probe and are heterodyned in converter 11 with signals from oscillator 12 which are frequency modulated within a prescribed band. Receiver 13 is resonant at a fixed frequency and is associated with the output circuit of converter 11 whereby in the course of a complete tuning cycle of variable oscillator 12, a beat radio frequency equal to the resonant frequency of receiver 13 is derived from the output of converter 11, the amplitude of said beat being proportional to the level of that noise impulse producing said beat. Thereupon the beat frequency is translated into an audio-frequency of proportional amplitude by receiver 13 and is then rectified by audio-frequency rectifier 14 whose direct-current output potential corresponds in magnitude to the input audio-frequency amplitude.

The direct-current output of rectifier 14 is applied to the vertically deflecting means of cathode-ray oscilloscope 15, thereby deflecting the cathode-raybeam in a vertical direction above the base line to an extent in accordance with the amplitude of the beat frequency. Sweep-voltage generator 16 provides a sawtooth voltage which varies in synchronism with the frequency scan of oscillator 12, said sawtooth voltage being impressed on the horizontal deflecting means of oscilloscope 15.

Accordingly, as the cathode-ray beam is deflected vertically to an amount in accordance with the noise impulses, the beam is concurrently swept horizontally in accordance with the position of the noise impulse frequency in the band. Thus, there is presented on the screen of oscilloscope 15 a panoramic view of the noise impulses within a predetermined band. By calibrating the horizontal screen base in terms of frequency and the vertical base in terms of amplitude, an instantaneous measurement of these noise impulses is given.

Features of the present invention will become more evident in the following explanation of the schematic circuits of converter 11, variable frequency oscillator 12, and sweep-voltage generator 16.

By way of example, let it be assumed that noise impulses lying within a band of .1 to 4 megacycles are to be analyzed and that this noise band is present in the output of untuned amplifier 10.

Variable frequency oscillator 12 is tunable within a range between 12.1 and 16 megacycles. Thus as oscillator 12 scans, a 12 megacycles difference beat is produced in the output circuit of converter 11 sequentially for every noise impulse within the noise band being analyzed, the other beats being discriminated against by the circuit arrangement. It is to be noted that at any instant a specific frequency of oscillator 12 is heterodyned with all frequencies in the noise band. In the course of a tuning cycle of oscillator 12, the difference beat common to all frequency combinations in this instance is 12 megacycles.

Receiver 13 which is of standard construction, preferably a superheterodyne having a high order of sensitivity and selectivity, is fixed at 12 megacycles. Conventional oscillator means are incorporated therein for beating with the received radio-frequency signal to produce an audio-frequency tone.

Converter 11 is a standard circuit except that the input circuits thereof are untuned to provide a broad band characteristic. It includes a pentagrid vacuum tube 18 having the control grid thereof coupled to the output of untuned amplifier 10 through a fixed capacitor 19. The plate circuit of tube 18 includes a parallel-resonant network 20 peaked at 12 megacycles, said network being adapted to reject all other frequencies.

Variable frequency oscillator 12 is of conventional design and includes a triode 21 associated with a resonant circuit having an inductance 22 shunted by a variable capacitor 23. The signal generated by oscillator 12 is impressed on the injector grid of converter tube 18 through coupling capacitor 24. Capacitor 23 is of balanced construction, being variable through 360 degrees of rotation and attaining maximum capacity every 90 degrees in the course of rotation. Consequently, the frequency range of oscillator 12 is fully traversed in one direction during 0°–90° and 180°–270° in a rotation cycle and in the reverse direction during 90°–180° and 270°–360°.

Sweep-voltage generator 16 includes a vacuum tube 25 incorporating a triode and diode section. The triode elements of tube 25 are associated with a fixed parallel-resonant network 26 in a conventional Hartley oscillator arrangement. Inductively coupled to network 26 is a coil 27, one side thereof being connected to the diode plate of tube 25, the other side being grounded through fixed capacitor 28. Thus the R.-F. voltage across coil 27 is rectified by the diode, the resultant pulsating direct-current being filtered by capacitor 28 and a resistor 31. The output of generator 16 is obtained at terminals 30.

Connected between parallel-resonant network 26 and coil 27, at the respective plate and cathode connections to the triode section of tube 25, is a variable capacitor 29, of a construction design similar to capacitor 23 of variable oscillator 12. It will now be observed that coil 27 is capacitatively coupled to network 26 by variable capacitor 29 and also, by reason of its proximity, inductively coupled thereto. The phase of voltage induced inductively in coil 27 is in phase opposition to that applied capacitatively by variable capacitor 29, hence as capacitor 29 is increased in value the rectified voltage across terminals 30 correspondingly diminishes as the capacitative transfer approaches the inductive transfer. The arrangement is made such that the capacitative transfer never exceeds the inductive transfer. Since capacitor 29 is similar to capacitor 23 it undergoes a full change in value four times each cycle of rotation.

In the present embodiment variable capacitors 23 and 29 are preferably of the type having a linear characteristic. Consequently, when capacitor 29 is rotated continuously, the voltage appearing across terminals 30 assumes the uniform sawtooth form illustrated by wave pattern 31'.

It is to be noted that the operating frequency of the Hartley oscillator in sweep-voltage generator 16 is not significant and does not control the frequency of sawtooth wave 31'. The frequency of sawtooth wave 31' is, however, governed by the rate of rotation of capacitor 29, said capacitor being driven by a motor 32 whose shaft is also mechanically ganged to capacitor 23.

The ganged arrangement of capacitors 23 and 29 is such that sawtooth 31' commences at one end of the frequency range of oscillator 12 and synchronously attains maximum voltage at the other end of the range, whereupon as the range is traversed in the opposite direction, the sweep-voltage falls to minimum.

Terminals 30 are connected to the horizontally deflecting plates of oscilloscope 15, while the output of audio-frequency rectifier 14 is connected to the vertically deflecting plates thereof. As a result, in the course of the full concurrent rotation of capacitors 23 and 29, the cathode-ray beam is swept across the screen in one direction thereby displaying all noise impulses within the prescribed band determined by oscillator 12, and the beam then retraces the same band in the reverse direction.

There exists a distinct advantage in this method. Inasmuch as the luminosity of the trace is an inverse function of beam velocity, the slower the scanning process the more visible is the presentation. However, in order to obtain visual persistence scanning speed above a predetermined minimum must be attained. Therefore, by utilizing both the forward and return portions of the trace in the manner of the present invention, it is possible to reduce beam velocity without sacrificing visual persistence.

A feature of the invention resides in the ability of the device to dwell on a selected noise impulse or signal, thereby enabling an individual examination of the impulse. With conventional sweep-voltage generators, after the sawtooth circuit is triggered the wave runs its course and it is not possible to freeze the resultant voltage wave at any particular level in magnitude. In the present invention, however, sweep-voltage generator 16 may be maintained at any selected point in the voltage wave by bringing capacitor 29 to an immediate stop. In consequence, capacitor 23, which simultaneously is brought to a halt in a corresponding position, fixes the frequency of oscillator 12 so that only one noise impulse is displayed on the screen of oscilloscope 15. This is accomplished by means of a brake mechanism 33 of any suitable design working in conjunction with motor 22.

While the above described embodiment of the invention is shown as employing capacitors 23 and 29 having a linear characteristic, capacitors having non-linear characteristics of any desired form may be substituted therefor for the purpose of expanding on the screen of oscilloscope 15 a desired portion of the frequency range and contracting a portion of lesser interest.

Superposed over the screen of oscilloscope 15 is a grid scale 34 whose horizontal base line is graduated in terms of frequency and whose vertical base line is graduated in amplitude. In the present embodiment, grid scale 34 is of linear design but obviously where a non-linear panoramic system is employed the scale may be correspondingly arranged.

The use of a heterodyne system in the present invention by means of converter 11 and variable oscillator 12 enables a wider noise band coverage than is possible where the band to be analyzed is determined only by the tuning range of receiver 13.

It is, of course, evident that the present invention may be utilized with equal effectiveness for the analysis of continuous wave signals.

An important advantage of the present invention is that it frees an operator to investigate an undesired source of noise impulses and presents instantaneously the results of any noise suppression means he may introduce at said source.

While there has been shown what is at present considered a preferred embodiment of the invention, it is apparent that many changes and modifications may be made therein without departing from the invention, and it is, therefore, intended in the accompanying claims to cover all such changes and modifications as fall within the true spirit and scope of the invention.

What is claimed is:

1. A sweep-voltage generator comprising a single source of alternating current, an impedance, means for deriving two alternating voltages from said single source, means for applying said two voltages in phase opposition across said impedance, means for rectifying the resultant voltage across said impedance, and means for periodically varying the amplitude of one of said alternating voltages to vary the resultant voltage across said impedance, whereby a sweep-voltage is produced in the output of said rectifying means.

2. A sweep-voltage generator as set forth in claim 1, wherein said periodically varying means is rotatable and varies said sweep-voltage from minimum to maximum and then back to minimum a plurality of times in a single rotation.

3. A sweep-voltage generator comprising an oscillator having a tank inductance, a pick-up inductance inductively coupled to said tank inductance, means coupling said tank inductance to said pick-up inductance to develop a voltage thereacross in phase opposition to the voltage developed by inductive coupling, means for rectifying the resultant voltage across said pick-up inductance, and means for continuously varying one of said voltages in phase opposition whereby a sweep-voltage is produced in the output of said rectifying means.

4. A sweep-voltage generator as set forth in claim 3, wherein said continuously varying means is rotatable and varies said sweep-voltage from minimum to maximum and then back to minimum a plurality of times in a single rotation.

5. A sweep-voltage generator comprising a radio-frequency oscillator having a tank inductance, a pick-up inductance inductively coupled to said tank inductance, a variable capacitor capacitatively coupling said tank inductance to said pick-up inductance to develop a voltage thereacross in phase opposition to that developed by inductive coupling, means for rectifying the resultant voltage across said pick-up inductance, and means for continuously varying said capacitor whereby a sweep-voltage is produced in the output of said rectifying means.

6. A sweep-voltage generator as set forth in claim 5, wherein said variable capacitor is rotatable and its capacitance varies from minimum to maximum and then back to minimum a plurality of times in a single rotation.

7. A sweep-voltage generator comprising a radio-frequency oscillator having a tank inductance, a pick-up inductance inductively coupled to said tank inductance, a variable capacitor capacitatively coupling said tank inductance to said pick-up inductance to develop a voltage thereacross in phase opposition to that developed by inductive coupling, means for rectifying the resultant voltage across said pick-up inductance, means for continuously varying said capacitor whereby a sweep-voltage is produced in the output of said rectifying means, and means for stopping the movement of said capacitor whereby said sweep-voltage is maintained at a selected point.

8. A sweep-voltage generator as set forth in claim 7, wherein said variable capacitor is rotatable and its capacitance varies from minimum to maximum at a given rate and then back to minimum at substantially the same rate a plurality of times in a single rotation.

EVERETT R. McCOPPIN.

References Cited in the file of this patent

UNITED STATES PATENTS

| Number | Name | Date |
| --- | --- | --- |
| 1,994,232 | Schuck, Jr. | Mar. 12, 1935 |
| 2,405,073 | Troell | July 30, 1946 |
| 2,497,883 | Harris, Jr. | Feb. 21, 1950 |
| 2,499,001 | Green | Feb. 28, 1950 |